United States Patent Office 3,305,506
Patented Feb. 21, 1967

3,305,506
TERRAZZO COMPOSITION AND METHOD
John A. Murray, Norristown, Pa., assignor to U.S. Terrazzo Panels, Inc., Norristown, Pa., a corporation of Pennsylvania
No Drawing. Filed June 23, 1964, Ser. No. 377,381
3 Claims. (Cl. 260—29.6)

This invention relates to building materials and more particularly to the composition and method of making a new terrazzo-like tile material which is especially suitable for this purpose.

Prior to this invention, the fabrication of an inexpensive terrazzo-like tile of sufficient size and strength to be used extensively in the building construction trade has not been possible. For example, attempts have been made to incorporate the pleasing appearance of terrazzo tile in the vertical facing panels of large buildings. Similarly, an inexpensive and durable substitute for marble has been sought for both the interior and exterior of buildings. Such a substitute would of necessity have to be characterized by a high tensile strength in relatively thin panels as well as flexibility under compression or tension which would avoid the problem of the material cracking under the normal design loadings present in modern structures. An additional benefit which has been desired and sought in the development of such materials is their ability to be altered in physical appearance to make them capable of being utilized in a large number of different architectural applications to enhance the appearance of the finished building.

It is therefore an object of this invention to provide a terrazzo-like composition and method of making the same which will provide a strong, flexible and inexpensive tile capable of being produced in nearly an infinite variety of appearances.

These and further objects and advantages are realized by the composition and method according to this invention as will become more apparent from the following description.

It has been discovered that the addition of a small amount of an internally plasticized copolymer of a polyvinyl acetate to an inert filler, a binder, aggregate and water produces a material on environmental curing which is both tough, flexible and inexpensive to produce. The material thus prepared according to this invention is readily cast, prior to curing and can be made in the form of tiles or plates of very large surface area. Tiles prepared according to the present invention have shown surprising strength upon test, even where the tiles are relatively thin.

In the preferred embodiment of this invention, sand is used as the inert filler material. As high as 40% to 50% by weight of sand to the total batch mix may be utilized. Dry bar sand of substantially uniform fineness, for example 8 mesh to 100 mesh, is generally chosen and is mixed with the other dry ingredients prior to any addition of water. Conventional dry cement of similar uniform fineness may be used as the binder.

To produce the terrazzo-like appearance in the cast product of this invention, marble chips of uniform or of random sizes may be incorporated into the dry mix. After the desired tile or plate or the like has been formed and cured it may be surface ground, on one or more sides, in a manner similar to the finishing of conventional terrazzo. This produces an attractive panel which can be advantageously utilized as a structural material or for other ornamental and utilitarian purposes.

The internally plasticized copolymer of vinyl acetate employed in the composition and method of this invention can be variously characterized. The preferred embodiment of this invention employs 1% to 2% by weight of the total batch mix of copolymer of vinyl acetate with dibutyl maleate in emulsion form using polyvinyl alcohol as the protective colloid. The vinyl acetate copolymer in this invention may either be in the form of a dispersion or of the dry solids recovered from a dispersion. The dispersion must be in water and may have from 54% to 56% total solids of a uniform or mixed particle size from between $0.3\mu$ to about $2.0\mu$. No plasticizers are employed in the preparation of the dispersion but as stated an emulsifier or a protective colloid may be used in minor proportions to form a stable emulsion. The dispersion may be prepared from a solid or liquid monomer of vinyl acetate with a minor proportion of any suitable monomer such that the resulting dispersion has a viscosity of from about 1000 to about 1400 cps. (Brookfield, #3 Spindle, 60 r.p.m. at 25° C.) or about 2 to about 25 on the Hoppler or Drage viscosimeter at 20° C. The dispersions may be further characterized by their film forming properties. Copolymer of vinyl acetate with dibutyl maleate in emulsion form using polyvinyl alcohol as the protective colloid has a film flexibility equivalent to homopolymers of vinyl acetate plasticized with 10% dibutyl phthalate, and a film flexibility equivalent to homopolymers of vinyl acetate plasticized with 20% dibutyl phthalate. If the solid recovered from such a dispersion is used, it may be redispersed prior to use in the process of this invention or even premixed dry with the binder, aggregate and filler.

In the preparation of the terrazzo-like tile or the like, the following process is exemplary of this invention. Three pounds of dry bar sand, one and one-half pounds of dry cement, and one and one half pounds of suitably selected and sized dry marble chips are all mixed together to form a uniform heterogeneous mixture. It is important at this stage of the process that the starting materials and the mix be thoroughly dry. Protective measures should be taken to protect both from infiltration by spurious moisture. The internally plasticized copolymer of vinyl acetate is placed in a separate container of the type recommended by its manufacturer. It is either introduced in the dry state and a dispersion formed intimately in the mixture by the addition of water or in the form of a dispersion initially.

If the material dispersion is added in the liquid state enough water is added to make a total dispersion in water mixture of from about 8 to 12 ounces. The dispersion and water mixture is then released into a suitable mixing machine which already contains the dry ingredients. An important step in the process is the subsequent thorough mixing of the total batch mixture. The batch must be mixed until the entire mass appears smooth. When the proper mixing has been achieved the mixture is transferred to a fabricating machine or the like for forming the desired configuration of finished product. This step may at the discretion of the individual fabricator be accompanied by either vibration or the application of pressure or any method well known to the art for eliminating any trapped air or other gas from the finished tile. The tile formed in the foregoing process is then allowed to set. The normal time for complete cure may fluctuate from 0 to 4 days depending upon the conditions of the curing environment.

Typical compositions representing the preferred embodiments of this invention were prepared substantially as described in the foregoing procedure with varying amounts of ingredients.

*Example 1*

|  | Percent |
|---|---|
| Aggregate (marble chips) | 22.5 |
| Binder (cement) | 22.5 |
| Inert filler (dry bar sand) | 45.0 |

|   | Percent |
|---|---|
| Copolymer of vinyl acetate with dibutyl maleate in emulsion form using polyvinyl alcohol as the protective colloid | 2 |
| Water | 8 |
| Total | 100.0 |

Example 2

| | |
|---|---|
| Aggregate (marble chips) | 20 |
| Binder (cement) | 20 |
| Inert filler (dry bar sand) | 50 |
| Copolymer of vinyl acetate with dibutyl maleate in emulsion form using polyvinyl alcohol as the protective colloid | 1 |
| Water | 9 |
| Total | 100 |

Example 3

| | |
|---|---|
| Aggregate (marble chips) | 25 |
| Binder (cement) | 25 |
| Inert filler (dry bar sand) | 40 |
| Copolymer of vinyl acetate with dibutyl maleate in emulsion form using polyvinyl alcohol as the protective colloid | 1 |
| Water | 9 |
| Total | 100 |

Example 4

| | |
|---|---|
| Aggregate (marble chips) | 20 |
| Binder (cement) | 20 |
| Inert filler (dry bar sand) | 46 |
| Copolymer of vinyl acetate with dibutyl maleate in emulsion form using polyvinyl alcohol as the protective colloid | 2 |
| Water | 12 |
| Total | 100 |

Example 5

| | |
|---|---|
| Aggregate (marble chips) | 22.5 |
| Binder (cement) | 22.5 |
| Inert filler (dry bar sand) | 41 |
| Copolymer of vinyl acetate with dibutyl maleate in emulsion form using polyvinyl alcohol as the protective colloid | 2 |
| Water | 12 |
| Total | 100.0 |

Variations which will be apparent to persons skilled in the art may be made in the sequence of the steps of the foregoing procedure and in the amounts of materials used, without departing from the spirit and scope of this invention. For example, the dispersion product may be mixed together with the dry ingredients. Water alone would then be added to form the smooth preparation. Trapped gases may be expelled either before or after casting. The marble chips may be added to the dry ingredients or at a latter stage. They may be used even after the tiles have been formed thereby enabling the fabricator to place them into interesting patterns in the formed tile. They may be subsequently pressed or rolled into the tile and after the tile has cured it may be ground or polished to achieve the sought for effects. Coloring materials may even be added to the mixture at any stage in the process to obtain an interesting appearing product.

Having described my invention, I claim:

1. A terrazzo composition in the form of a thin tile consisting essentially by weight of
   (a) about 40% to about 50% sand,
   (b) about 20% to about 25% marble chips,
   (c) about 20% to about 25% cement,
   (d) about 1% to about 2% of an internally plasticized copolymer of vinyl acetate with dibutyl maleate in emulsion form using polyvinyl alcohol as the protective colloid, and having a viscosity of about 1000–1400 cps. Brookfield, and
   (e) about 8% to about 12% water.

2. A method of preparing a building material comprising the steps of:
   (a) mixing together in the dry state 40% to 50% by weight of sand, 20% to 25% marble chips, 20% to 25% cement,
   (b) mixing together about 8% to about 12% by weight of water together with about 2% to about 4% of a water dispersion with about 50% to about 60% total solids, of copolymer of vinyl acetate with dibutyl maleate in emulsion form using polyvinyl alcohol as the protective colloid,
   (c) mixing together the ingredients prepared as in (a) and (b) and stirring the mixture of materials a sufficient time until it achieves a smooth castable consistency,
   (d) expelling the trapped gases present in said mixture,
   (e) casting said material into a desired shape, and
   (f) allowing sufficient curing time at ambient temperatures for said material to develop a permanent set condition.

3. The method defined in claim 2, further including the step of subjecting the surface of the material to grinding.

References Cited by the Examiner

UNITED STATES PATENTS 2,491,487   12/1949   Faulwetter _____ 260—29.6

FOREIGN PATENTS 666,865   2/1952   Great Britain.

MURRAY TILLMAN, *Primary Examiner.*

N. F. OBLON, *Assistant Examiner.*